(12) United States Patent
Hogoy

(10) Patent No.: US 8,470,178 B2
(45) Date of Patent: Jun. 25, 2013

(54) ORGANIC OIL BOOM

(76) Inventor: Ingmar Hogoy, Storebo (NO)

( * ) Notice: Subject to any disclaimer, the term of this patent is extended or adjusted under 35 U.S.C. 154(b) by 0 days.

(21) Appl. No.: 13/496,204

(22) PCT Filed: Oct. 12, 2010

(86) PCT No.: PCT/NO2010/000359
§ 371 (c)(1),
(2), (4) Date: Mar. 15, 2012

(87) PCT Pub. No.: WO2011/046445
PCT Pub. Date: Apr. 21, 2011

(65) Prior Publication Data
US 2012/0193288 A1     Aug. 2, 2012

(30) Foreign Application Priority Data

Oct. 12, 2009   (NO) .................................... 20093121

(51) Int. Cl.
*B01D 11/04* (2006.01)
*C02F 1/26* (2006.01)

(52) U.S. Cl.
USPC ........... 210/639; 210/634; 210/638; 210/749; 210/925

(58) Field of Classification Search
None
See application file for complete search history.

(56) References Cited

U.S. PATENT DOCUMENTS

| | | | | |
|---|---|---|---|---|
| 3,755,189 A | * | 8/1973 | Gilchrist et al. | 516/108 |
| 3,919,083 A | * | 11/1975 | O'Sullivan et al. | 210/734 |
| 6,264,398 B1 | * | 7/2001 | Yamada et al. | 405/62 |
| 2007/0235391 A1 | | 10/2007 | Ylikangas et al. | |

FOREIGN PATENT DOCUMENTS

| | | |
|---|---|---|
| EP | 0979802 A | 2/2000 |
| EP | 1862434 A | 12/2007 |
| GB | 608468-X | 9/1948 |
| GB | 1472964 A | 5/1977 |
| NO | 326276-X | 10/2007 |
| NO | 20084723-X | 1/2009 |

\* cited by examiner

*Primary Examiner* — Katherine Zalasky
(74) *Attorney, Agent, or Firm* — Christian D. Abel

(57) ABSTRACT

An organic oil boom is a method for containing pollution floating on water or the sea. The invention describes a method that makes it possible to isolate pollution as, for example, oil, from the surrounding environment. Spraying a viscous liquid such as an alginate or chitosan solution over and around the oil results in isolation of the oil from the seawater as the mixture has a density that is lighter than seawater and heavier than oil. To isolate the oil also from the air, a gas is added so that the density of the mixture is lower than the density of the oil. The addition of a multivalent cation solution such as calcium ions will, under the right pH conditions, polymerise the viscous liquid, thus forming a solid polymer film which surrounds the oil and isolates it from the surrounding environment.

13 Claims, 2 Drawing Sheets

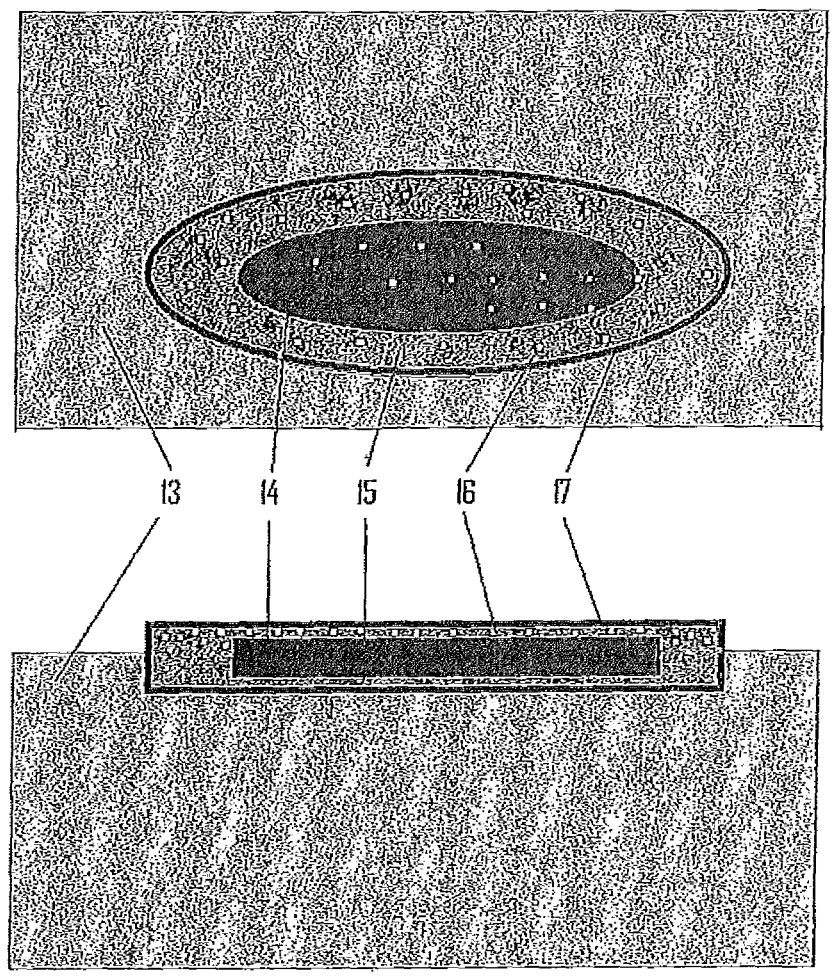

ORGANIC OIL BOOM

FIELD OF APPLICATION OF THE INVENTION

Figure 1:
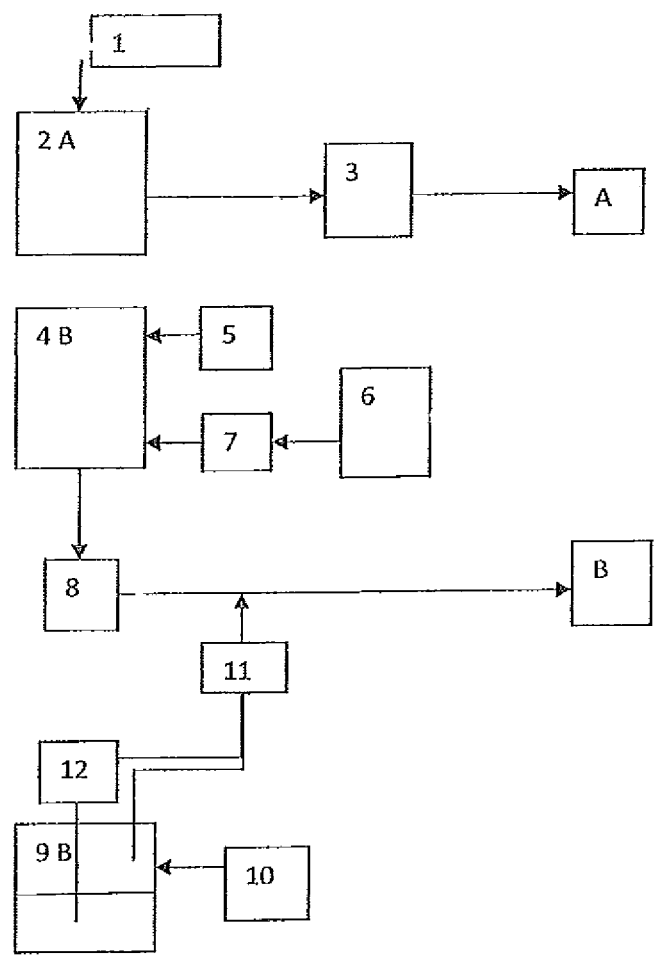

The present invention relates to a method for containment and isolation of substances that have escaped into the environment. Through use of the invention, the substances concerned can be prevented from coming into direct contact with the surrounding environment in that a viscous liquid in sprayed onto and around the substance in question and thus contains and isolates the substance from the surroundings. This viscous liquid may comprise a polysaccharide dissolved in water. The addition of a multivalent cation will, under the right pH conditions, result in the formation of a stable polymer shell around the substance in question which is thereby isolated from the surrounding environment.

DESCRIPTION OF METHODS USED AND THEIR LIMITATIONS

Existing oil booms and oil pollution collection technology cannot be used during large parts of the year because of poor weather and current conditions and when there are waves of more than 2-3 metres in height. The industry is continuously on the look-out for methods capable of isolating and collecting oil in poor weather and current conditions.

In the event of uncontrolled oil spills, existing methods for isolation and collection have a very limited effect owing to the physical impact of the wind, waves, current and temperature. Oil that is collected in a conventional oil boom might escape underneath or over the oil boom. The effect of temperature causes volatile constituents of the oil to evaporate and the oil becomes more viscous as a result of this evaporation of volatile components.

The conventionally used oil booms isolate the oil from the environment in only one dimension, and that is along the side, in that the oil slick involved is surrounded by the oil boom. Currents thus affect the oil from below, waves have an impact from both on top and below, and the air takes up volatile components as a result of evaporation. Two of three dimensions are thus open, allowing the oil to escape from the boom.

The impact of waves and current causes oil slicks to spread quickly and become diluted in the environment. This means that a short time after an oil spill it will often not be expedient to use an oil boom for collection as the concentration of oil in the area in question will be small, and the oil will be spread over a large area. Access to oil booms will be limited, and it will not be practically possible to collect oil by using an oil boom a relatively short time after an accident.

A common method used in connection with oil pollution, in addition to an oil boom, is the use of chemicals that disperse, dissolve, the oil. This method involves the dissolution of oil slicks into small droplets of oil that are diluted in the environment. The oil is then not accessible for collection, but remains in the environment and sinks down in the water masses. This method is highly controversial on environmental grounds and the chemicals used may have a more adverse environmental impact than the oil spill itself.

Oil that floats into shore zones is very difficult to remove. The method employed is to use simple aids for mechanical removal of the oil from rocks, sand and vegetation. The methods employed for removing oil from the shore zone are very primitive and resource-consuming.

STATE OF THE ART

It is known that polymers such as alginate and chitosan are able to gel and polymerise on the addition of multivalent cations as, for example, calcium ions (Ca2+) and, under the right pH conditions, form a stable polymer gel in that the divalent cations cross-link with several polymer molecules. This organic polymer property is utilised in a number of different industrial processes such as adjustment of the viscosity of foodstuffs, stabilisation of emulsions in oil/water mixtures, encapsulation of medicines and feed and for water purification. It is known that alginate and chitosan can be used in different methods of water purification. Norwegian Patent NO 20084723 entitled: "Method for removal of materials from a liquid stream" describes a method for removing hydrocarbons from a liquid stream through incorporation of alginate. The patent describes a method for removing oil in a closed liquid stream.

ADVANTAGES OF THE PRESENT INVENTION

The invention described consists primarily of water, together with small amounts of additives which form a viscous liquid. Water and additives are mixed and sprayed out around and over the relevant area containing oil and the oil is isolated from the surrounding environment. Given the right chemical conditions, the viscous liquid will polymerise and form a solid film of polymer which surrounds the oil. In order that the right chemical conditions should be present, it may be necessary to add multivalent cations and an acid or base to obtain the correct pH. The additives may be an alginate salt or a water-soluble chitosan.

The invention described isolates the substance in question in that it surrounds it in three dimensions, along the side, on the top and underneath. The impact of wind, waves and evaporation of volatile components will be reduced. Isolation of the substance in question from the surroundings prevents contact with the environment and, for example, the fouling of seabirds will be limited.

The use of the present invention will result in the capacity of equipment being readily adaptable to the actual need, and it will be easier to isolate oil in small concentrations than it would be when using an oil boom. With adequate access to fresh water and the necessary additives, it will be easy to scale up the capacity to cope with large spills without having large amounts of pre-manufactured and stored equipment.

The additives used are based on natural raw materials and are considered to be harmless to the environment in the concentrations involved. The invention described is therefore an extremely environment-friendly solution compared with the dispersants that are used. The oil can be collected in a conventional way instead of being dissolved in and having an impact on the environment.

The present invention will not be able to remove oil that has already reached the shore zone. However, treating the shore zone in accordance with the present invention in exposed areas before the oil has reached the shore will result in the formation of a film that will separate the oil from the shore zone, and clean-up can be simplified inasmuch as the oil is not in direct contact with the shore material.

SUMMARY OF THE INVENTION

The object of the invention is to provide a new and improved process for containment of oil and other pollution floating on the sea. In the method one polymer such as alginate salt or water-soluble chitosan is mixed with water and forms a viscous liquid. This viscous liquid is sprayed around and over the polluted sea area. The viscous liquid has a density that is lower than that of seawater but higher than that of oil, and will thus form a layer between the oil and the seawater. The oil is then isolated along the side and underneath. To obtain the polymerised liquid, a multivalent cation such as calcium is added. This can be done by mixing calcium chloride with water that is sprayed out as a separate mixture or as part of the polymer solution. When alginate is used, an acid must be added to lower the pH. When chitosan is used, a base can be added to increase the pH in order to obtain a stable polymer gel. In seawater a high content of sodium ions and other monovalent ions may contribute to attenuation of the polymerisation, resulting in a weak gel. This situation can be improved by adding calcium ions and carrying out the process twice, or by spraying out pH-adjusted water with calcium ions before the polymer solution is sprayed out.

To isolate the oil on the upper surface it may be necessary to reduce the density of the polymer mixture so that the density of the mixture is lower than the density of the oil. This can conveniently be done by pumping a gas into the viscous mixture. The gas may be air, carbon dioxide or another suitable gas. The gas will be trapped in the form of bubbles and thus lower the density so that the mixture floats on top of the oil. The oil will thus be completely isolated from the surrounding environment.

To get the gas bubbles within the liquid to be more stable, a mixture of multivalent cation dissolved in water and having the right pH can be added together with the injected gas. Polymerisation will then take place within the viscous liquid which traps the gas bubbles inside. To obtain a corresponding external polymerisation, a solution of, for example, calcium ions with the right pH is sprayed over the liquid. The oil will now be surrounded in three dimensions. This will prevent other organisms, as, for example, birds, from coming in direct contact with the oil. The impact of currents and waves will be reduced and evaporation of volatile components of the oil will be slowed down.

EXPERIMENT 1

5 g of sodium alginate (0.5%) is sieved over 1000 g of water with vigorous stirring using a hand blender. Sieving and mixing prevents the mixture from lumping. The grey and partly transparent viscous liquid has a red colorant added thereto to visualise the effect of its use. The liquid is designated composition A. 10 g of calcium chloride is dissolved in 1000 g of water and 10 g of 10% acetic acid is added for pH adjustment. The liquid is designated composition B.

10 g of oil is poured into a vessel containing seawater with 2.8% salt. Liquid A is sprayed around and over the floating oil. The oil is surrounded by the viscous liquid along the side and underneath. This isolates the oil from the seawater. Liquid B is sprayed over the area and a polymer film is immediately formed under the oil which stabilises the viscous liquid.

EXPERIMENT 2

This experiment is carried out in accordance with Experiment 1. After the polymer has isolated the oil from the seawater, a mixture of air and composition B is forced into solution A. The air is trapped in liquid A in that the bubbles are encapsulated in liquid A by internal polymerisation.

The viscous and air-filled liquid is then sprayed over the oil that has been treated according to Experiment 1. The oil is now contained and isolated from the surrounding environment in three dimensions, along the side, on the top and underneath. When sprayed over with liquid B, composition A is polymerised on the top and the oil is completely surrounded by a stable polymer film.

Description of Drawings with Positions

Attached FIG. 1 shows a schematic flow chart for the preparation of solutions A and B which later can be used to contain oil on seawater according to FIG. 2.
(1) Sieve for metering polymer powder.
(2) Mixing tank with mixer and water for mixing liquid A
(3) Pump for pumping out liquid A
(4) Mixing tank with water for mixing liquid B
(5) Addition of calcium chloride powder
(6) Tank with acid (or base when using chitosan)
(7) Metering pump for acid (or base when using chitosan)
(8) Pump for pumping out liquid B
(9) Pressure tank with air and liquid B
(10) Compressed air
(11) Metering valve for air and liquid B
(12) Metering valve for liquid B Attached FIG. 2 shows containment of oil in seawater by using liquid A and B prepared in accordance with FIG. 1.
(13) Seawater
(14) Oil on sea
(15) Polymer A that isolates the oil from the seawater.
(16) Polymer A with air and liquid B that isolates the oil from the air.
(17) Polymer film that is formed by mixing A and B and surrounds the oil.

The invention claimed is:

1. A method for isolating a fluid liquid that is floating on the surface of another liquid, comprising the following steps of
   a) applying to a first liquid floating on the surface of a second liquid a viscous liquid comprising a polysaccharide dissolved in water, which viscous liquid has a density such that it forms a layer between the first liquid and the second liquid;
   b) adding to the polysaccharide a multivalent cation at pH conditions such that the polysaccharide is polymerised into a solid polymer which isolates the first liquid from the surface of the second liquid;
   c) applying to the first liquid a viscous liquid comprising a polysaccharide dissolved in water, which viscous liquid has a density such that it forms a layer on the upper surface of the first liquid;
   d) adding to the polysaccharide a multivalent cation at pH conditions such that the polysaccharide is polymerised into a solid polymer which isolates the upper surface of the first liquid from the surrounding environment.

2. A method according to claim 1, wherein the viscous liquid is an anionic polysaccharide comprising an alginate salt dissolved in water.

3. A method according to claim 1, wherein the viscous liquid is a cationic polysaccharide comprising chitosan dissolved in water.

4. A method according to claim 1, wherein the multivalent cation is calcium dissolved in water.

5. A method according to one of claims 1-4, wherein the multivalent cation has an acid added thereto and thus polymerises the anionic polysaccharide into a solid polymer which isolates the said pollution from the underlying water.

6. A method according to one of claims 1-4, wherein the multivalent cations have added thereto a base, and thus polymerise the cationic polysaccharide into a solid polymer which isolates the first liquid from the underlying second liquid.

7. A method according to one of claims 1-4, wherein the density of the viscous liquid that forms a layer on the surface of the first liquid is produced in that a gas is added to the polysaccharide solution, thereby reducing the density of the viscous liquid in that gas bubbles are surrounded by the viscous liquid.

8. A method accord to claim 7, wherein multivalent cation and acid are added to the gas, thereby forming a polymer of anionic polysaccharide around the added gas bubbles.

9. A method according to claims 7, wherein multivalent cation and base are added to the gas, thereby forming a polymer around the added gas bubbles.

10. A method according to claim 1, wherein the first liquid is a pollution mass and the second liquid is the sea.

11. A method according to claim 10, wherein an extended zone of the polymerised polysaccharide solution is formed between the pollution and another area in order to produce a barrier between the pollution and the other area.

12. A method according to claim 11, wherein the other area is a shore zone.

13. A method for protecting a shore zone from a floating pollution mass comprising forming a barrier of polymerised polysaccharide between the pollution and the shore, the polymerised polysaccharide being formed in that a viscous liquid comprising a polysaccharide dissolved in water has added thereto a multivalent cation at pH conditions such that the polysaccharide is polymerised into a solid polymer.

* * * * *